(12) United States Patent
Lavie et al.

(10) Patent No.: US 10,633,091 B2
(45) Date of Patent: Apr. 28, 2020

(54) ACCIDENT MONITORING USING REMOTELY OPERATED OR AUTONOMOUS AERIAL VEHICLES

(71) Applicant: Scope Technologies Holdings Limited, Geneva (CH)

(72) Inventors: Samuel Lavie, Johannesburg (ZA); Gil Emanuel Fuchs, Nes Tziona (IL); Clayton Richard Morlock, Lebanon, NH (US)

(73) Assignee: Scope Technologies Holdings Limited, Tortola (VG)

( * ) Notice: Subject to any disclaimer, the term of this patent is extended or adjusted under 35 U.S.C. 154(b) by 488 days.

(21) Appl. No.: 15/010,103

(22) Filed: Jan. 29, 2016

(65) Prior Publication Data

US 2016/0236638 A1    Aug. 18, 2016

Related U.S. Application Data

(60) Provisional application No. 62/109,434, filed on Jan. 29, 2015.

(51) Int. Cl.
*B64C 39/02* (2006.01)
*H04N 7/18* (2006.01)
(Continued)

(52) U.S. Cl.
CPC ........ *B64C 39/024* (2013.01); *G06K 9/00624* (2013.01); *G06K 9/00771* (2013.01); *G08G 1/012* (2013.01); *G08G 1/0112* (2013.01); *G08G 1/0116* (2013.01); *G08G 1/0133* (2013.01); *G08G 1/04* (2013.01); *G08G 1/205* (2013.01); *G08G 7/00* (2013.01); *H04N 7/185* (2013.01);
(Continued)

(58) Field of Classification Search
None
See application file for complete search history.

(56) References Cited

U.S. PATENT DOCUMENTS

| | | | |
|---|---|---|---|
| 6,690,294 B1 * | 2/2004 | Zierden | G08G 1/052 340/933 |
| 7,761,544 B2 | 7/2010 | Manasseh et al. | |

(Continued)

FOREIGN PATENT DOCUMENTS

| | | |
|---|---|---|
| CN | 102436738 A | 5/2012 |
| EP | 0466499 A1 | 1/1992 |
| WO | 2014080388 A2 | 5/2014 |

OTHER PUBLICATIONS

Copernheaver, Blaine, PCT International Search Report for PCTUS2016/015514, dated Jun. 20, 2016.

(Continued)

*Primary Examiner* — Dakshesh D Parikh
(74) *Attorney, Agent, or Firm* — Downs Rachlin Martin PLLC

(57) ABSTRACT

A system to monitor vehicle accidents using a network of aerial based monitoring systems, terrestrial based monitoring systems and in-vehicle monitoring systems is described. Aerial vehicles used for this surveillance include manned and unmanned aircraft, satellites and lighter than air craft. Aerial vehicles can also be deployed from vehicles. The deployment is triggered by sensors registering a pattern in the data that is indicative of an accident that has happened or an accident about to happen.

12 Claims, 6 Drawing Sheets

(51) Int. Cl.
*G06K 9/00* (2006.01)
*G08G 7/00* (2006.01)
*G08G 1/01* (2006.01)
*G08G 1/00* (2006.01)
*G08G 1/04* (2006.01)
*B60R 21/00* (2006.01)
*G08G 1/065* (2006.01)

(52) U.S. Cl.
CPC . *B60R 2021/0027* (2013.01); *B64C 2201/022* (2013.01); *B64C 2201/027* (2013.01); *B64C 2201/123* (2013.01); *B64C 2201/127* (2013.01); *G08G 1/065* (2013.01)

(56) References Cited

U.S. PATENT DOCUMENTS

| | | | |
|---|---|---|---|
| 8,444,082 | B1 | 5/2013 | Foch |
| 8,615,105 | B1* | 12/2013 | Cheng ................ G06K 9/00771 382/103 |
| 8,930,044 | B1 | 1/2015 | Peeters et al. |
| 2003/0095038 | A1 | 5/2003 | Dix |
| 2003/0191568 | A1* | 10/2003 | Breed ................... B60W 40/06 701/36 |
| 2005/0046584 | A1 | 3/2005 | Breed |
| 2006/0092043 | A1* | 5/2006 | Lagassey ............... G07C 5/008 340/907 |
| 2006/0092890 | A1 | 5/2006 | Gupta et al. |
| 2006/0241853 | A1 | 10/2006 | Gadler |
| 2008/0157940 | A1 | 7/2008 | Breed et al. |
| 2011/0046842 | A1 | 2/2011 | Smith |
| 2011/0147513 | A1* | 6/2011 | Surmont ................. B64B 1/10 244/33 |
| 2012/0018989 | A1 | 1/2012 | Breed |
| 2012/0089299 | A1 | 4/2012 | Breed |
| 2013/0046562 | A1 | 2/2013 | Taylor et al. |
| 2014/0211487 | A1* | 7/2014 | Spiro ...................... F21V 23/06 362/382 |
| 2014/0279707 | A1 | 9/2014 | Joshua et al. |

OTHER PUBLICATIONS

"Persistent Surveillance Systems—iView Analyst Toolkit", located at http://media.wix.com/ugd/9845f4_e7107732d9a94dfaa88e9752c72574f8.pdf.

Donnell, Peter, "Renault Concept Car Come Equipped with Quadcopter Drone", 2014 http://www.eteknix.com/renault-concept-car-comes-equipped-with-quadcopter-drone/.

Gaszczak, Anna, et al, Real-time People and Vehicle Detection from UAV Imagery, Cranfield University, School of Engineering, United Kingdom.

Gentil, Gregoire, "MeCam: Nano drone to point-and-stream yourself" published at https://www.alwaysinnovating.com/products/mecam.htm.

McCormack, Edward, Year: 2009,Source: ITE Journal, vol. 79, No. 12, pp. 32-36,Publisher: Institute of Transportation Engineers.

Mimbela, Luz Elena Y., et al, Summary of Vehicle Detection and Surveillnace Technologies Used in Intelligent Transportation Systems, 2000, Published by The Vehicle Detector Clearinghouse,Southwest Technology Development Institute (SWTDI), see https://www.fhwa.dot.gov/ohim/tvtw/vdstits.pdf.

Nighthhawk Aerial Surveillance: https://apps.fcc.gov/els/GetAtt.html?id=138671&x=.

Padmavathi, D. et al, A Study on Vehicle Detection and Tracking Using Wireless Sensor Networks, in Wireless Sensor Network, Feb. 2010, vol. 2, pp. 173-185.

Publication No. FHWA-HRT-14-037 | Nov. 2013, Federal Highway Administration.

* cited by examiner

ACCIDENT MONITORING USING REMOTELY OPERATED OR AUTONOMOUS AERIAL VEHICLES

1 RELATED APPLICATIONS

This application claims priority to U.S. Provisional Application 62/109,434 filed on 29 Jan. 2015 and entitled ACCIDENT MONITORING USING REMOTELY OPERATED OR AUTONOMOUS AERIAL VEHICLES which is herein incorporated by reference.

U.S. patent application titled "SYSTEM AND METHOD FOR USE OF PATTERN RECOGNITION IN ASSESSING OR MONITORING VEHICLE STATUS OR OPERATOR DRIVING BEHAVIOR", application Ser. No. 13/679,722, filed Nov. 16, 2012; which claims the benefit of priority to U.S. Provisional Patent Application No. 61/578,511, filed Dec. 21, 2011; PCT/US12/71487 titled "SYSTEMS AND METHODS FOR ASSESSING OR MONITORING VEHICLE STATUS OR OPERATOR STATUS" filed 21 Dec. 2012; and Ser. No. 14/317,624 titled "System and method for Determining of Vehicle Accident information" file on 27 Jun. 2014; each of which the above applications are herein incorporated by reference.

2 INTRODUCTION

Aspects of this invention are designed to provide as close to real-time surveillance of a vehicle accident as possible to both estimate the amount and extent of damage to the vehicle or vehicles and to determine bodily harm. In response to the estimates appropriate emergency response vehicles can be deployed and the repair process can be initiated including relaying, to adjusters, damage estimates and surveillance information to determine causality.

Specific aspects of this invention include methods and system to detect accidents before they happen or while they happen; methods and systems to anticipate an accident based on measurements acquired of vehicle movements and driving conditions that are historically indicative of an accident.

Sensors within a vehicle; deployed from a vehicle for aerial surveillance; deployed from a fixed based station for aerial surveillance; long term flight aerial surveillance; and fixed sensors that monitor a transportation network may be deployed.

Various techniques for image analysis, statistics and machine learning are utilized to analyze both real-time and historical data concerning accidents.

In addition to accident detection and analysis the systems and methods described within this document are also useful, for example, for traffic monitoring, and crime prevention and detection.

3 BACKGROUND

Driving a vehicle continues to be one of the most hazardous activities that a person can participate in. Vehicle accidents are one of the leading cause of death every year. Damage from accidents amounts to billions of dollars a year. To date, most vehicle accidents are assessed after-the-fact by personal arriving on the scene after the incident. The assessments almost always utilize some type of human interface either to estimate damage or transpose information into a machine readable form. This human interface introduces many biases and uncertainties into the process. These biases and uncertainties then translate into litigation when it is necessary to determine cause for insurance purposes or from a safety standard.

Attempts have been made to take sensor information from in-vehicle sensors and associate this information to external information and factors to reconstruct accidents and/or determine when an accident occurs, but this work is in early stages.

The advent of unmanned aerial vehicles (UAV) with associated sensor arrays has added a new method of monitoring vehicle activity and accident scene surveillance. However, the changing regulatory atmosphere makes reliance on any one type of surveillance method risky from the fact that it may be illegal in the near future. For example, in December 2014, the US Congress is considering that UAVs for commercial unlicensed use can only fly 400 feet in the air and must be in view of the handler. Even more restrictive rulings may apply. For this reason and others, data fusion among several sensor arrays is important to any vehicle or accident scene surveillance system as certain methods may not be allowed in the long run.

An aim of this invention is both to navigate the uncertain regulatory landscape and also take advantage of the array of sensors; sensor delivery vehicles and methods; and statistical and machine learning analysis techniques for accident prediction and accident scene surveillance.

4 BRIEF DESCRIPTION OF THE FIGURES

5 OVERVIEW

Figure 1:
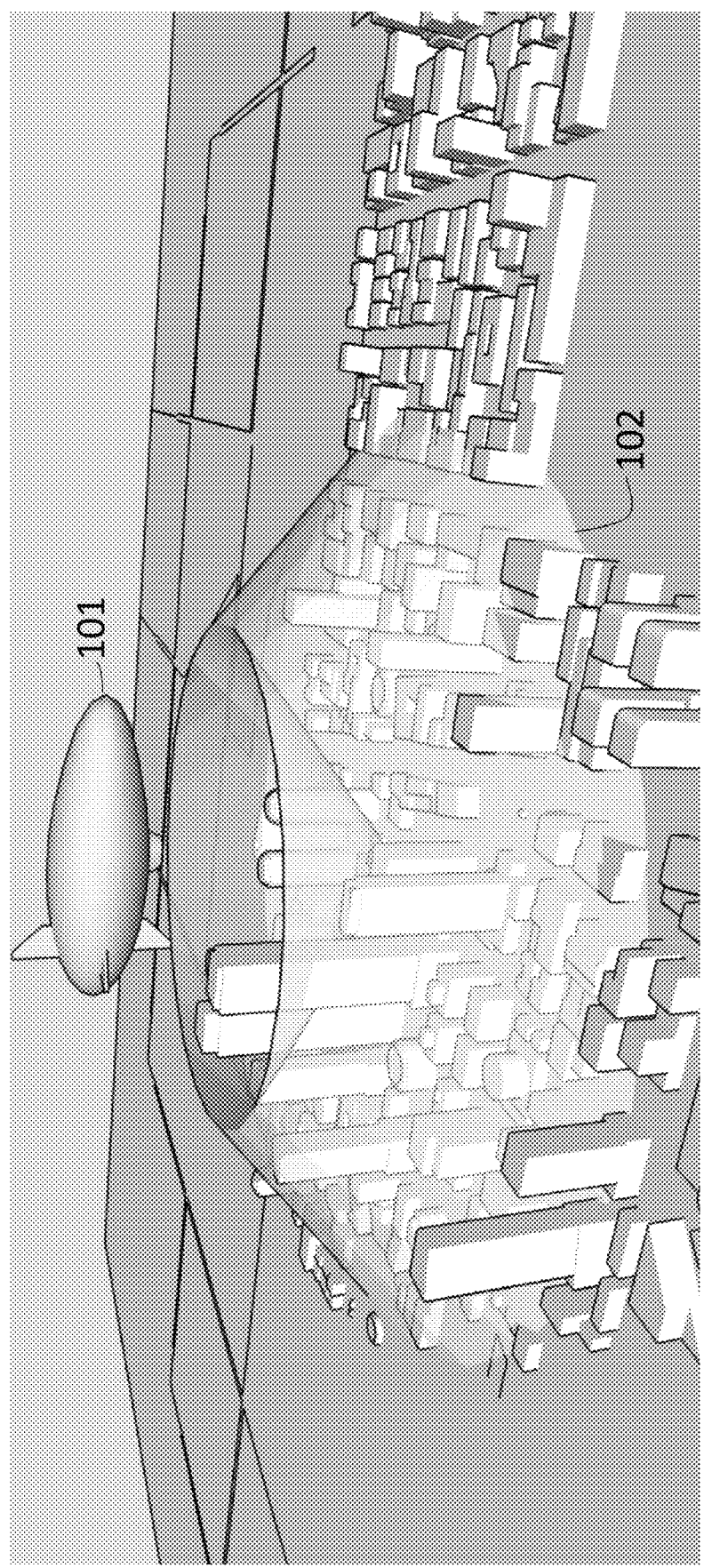
FIG. 1 depicts and embodiment using aerial surveillance from a blimp.

Some objects of this invention are systems and methods to detect vehicle accidents and observe vehicle accident scenes.

The tools used for this are sensors within a vehicle or vehicles including: video cameras; sensors that are part of the vehicle; and additional sensors that are part of a portable device within the vehicle. Other sensor systems include stationary sensors that are associated with the vehicle transportation network, for example, traffic counters, and speed cameras. Additional information may be provided by weather stations. Aerial sensors can be mounted, for example, in ROVS, autonomous drones, and manned aircraft. In addition, sensors can be outside the atmosphere mounted on satellites. Individual vehicles may be tracked by GPS or wireless transmitter signal strength triangulation to assess movements prior to an accident.

Analysis consists of statistical analysis of sensor data from one or more system types and delivery systems where the analysis is performed by comparison of historical patterns indicative of an accident about to occur or an accident that has happened and further patterns used to assess damage and injury.

Novel ROV/autonomous flying vehicles that are deployed from a vehicle are also part of this invention.

5.1 Surveillance Methods

Surveillance methods for this document are broken into five types:

- Aerial surveillance which has an identified area to monitor vehicle movement and activities. The area could be part of a road network defined by geographic borders; it could be an intersection known to have a potential for many collisions. The area could change during different time periods or day of the week based on historical collision or accident rates.
- On-Vehicle Surveillance which consists of a sensor suite that is part of the vehicle and perhaps sensors that are part of a mobile device within the vehicle.
- Event Surveillance where sensor suites are deployed (usually in the air) from either a vehicle, a fixed base station or where a passive sensors system is trained on an accident scene once an accident or potential accident is detected.
- Ground Based surveillance which typically is performed by stationary sensors along a roadway or intersection and measures things like traffic counts or vehicle speed (an average speed) and/or weather and road conditions.
- Remote Sensing consists of numerous techniques including such things as weather satellites that can provide background information with respect to weather and road conditions.

All of these surveillance method could be used in both a passive or active mode. Passive mode is where general information is recorded and stored for a fixed amount of time, then discarded unless an event such as an accident is identified. If an event such as an accident occurs, pertinent information is retrieved and analyzed and then transmitted to an analysis station or first responders or other surveillance systems.

Active mode surveillance is defined as occurring when some sensor pattern indicative of an event of interest occurs and is used to initiate specific surveillance. The sensor pattern may trigger additional recordation of information and/or direct sensors to monitor at a certain location and perhaps with an increased frequency of measurement than that which happens during passive surveillance.

5.1.1 Aerial Surveillance

If is known in the art how to identify and track multiple vehicles and/or pedestrians using high altitude surveillance. This technology is much like facial recognition software used in virtually every digital camera where multiple faces can be identified and tracked. Aerial Surveillance can be from fixed wing aircraft or rotary aircraft or lighter than air vehicles. The surveillance can occur from manned or unmanned vehicles.

In an embodiment of this invention passive aerial surveillance is used by itself or in tandem with other surveillance methods.

An example of a passive aerial surveillance is shown in FIG. 1. An aerial vehicle 101 continually scans an area filled with roads and vehicles 102. Vehicles coming in and out of the area 102 are identified. An account of individual vehicles entering and leaving the survey area can be maintained over time.

An aerial surveillance module (either that is part of the aerial surveillance vehicle or that is in remote communication with the aerial vehicle) is used to observe ground vehicle movement.

The aerial surveillance module, in addition to vehicle recognition software, also has a digital map of the survey area. By tracking the movement of individual vehicles through the survey area, the aerial surveillance module can detect:

- If a vehicle is off the road
- If a vehicle is exceeding the speed limit
- If a vehicle is in very close proximity with another vehicle
- If equipped with thermal imaging, if a vehicle is on fire.
- A vehicle driving erratically or swerving
- Traffic as a whole moving slowly or stopped During analysis of the passively acquired data, the aerial surveillance module can transmit instructions to other surveillance systems (either aerial, fixed or vehicle based) via wireless communications to alert these other systems that active monitoring of a situation may be necessary.

Figure 2:
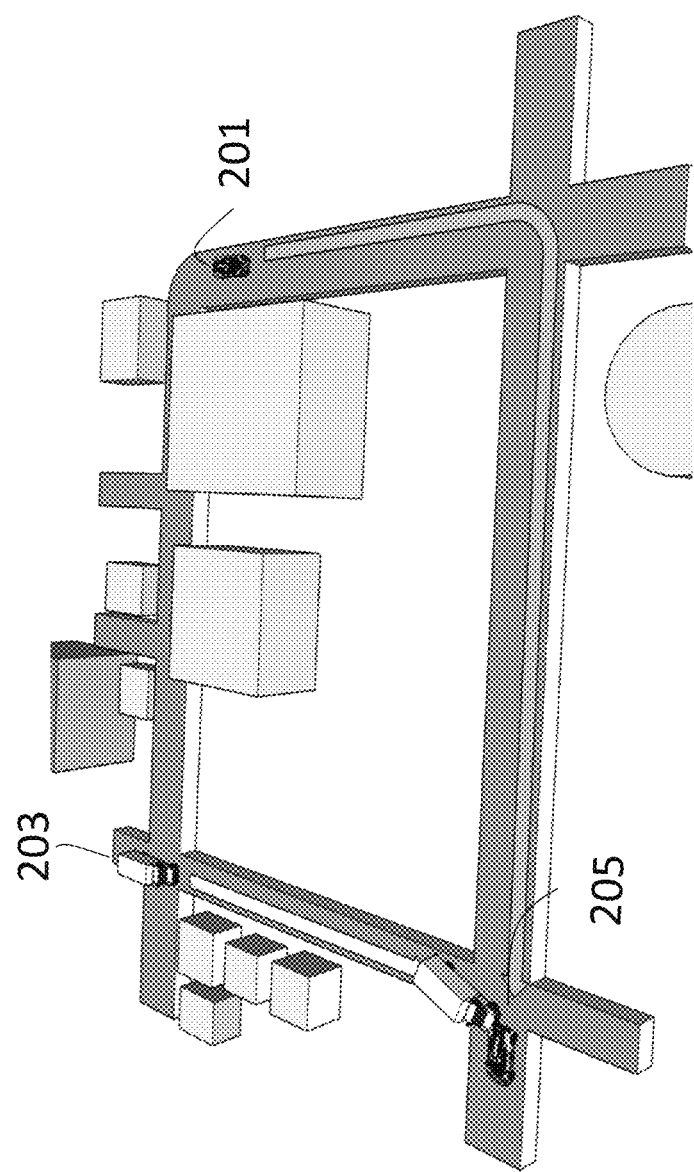
FIG. 2 Depicts an accident scene being tracked.

FIG. 2 depicts result that could be obtained from aerial surveillance. At a time 1, vehicle 201 and a second vehicle 203 are observed at a first location and are continued to be tracked until a second time where it is observed that Vehicle 203 collides with vehicle 201 at location 205. Upon detection of the accident pattern indicative of the collision (described elsewhere in this text), information may be transmitted to vehicles 201 and 203 or to emergency authorities or others. The information may contain the travel history of the two vehicles including their locations and speeds and driving behavior.

In addition to the above triggers, communications may be initiated with other surveillance systems when a vehicle moves out of the surveillance area and if there was a reason to continue monitoring it in other quadrants or surveillance areas.

In an embodiment, a scenario for aerial surveillance is:
1) Identify vehicles entering the surveillance area
2) Track each vehicle and determine speed and acceleration through the area
3) Communicate with weather and on-vehicle surveillance systems and identify risky driving behavior patterns associated with the current driving conditions.
4) Identify vehicles exhibiting risky driving behavior in the surveillance area by comparison of movements of each vehicle relative to the road network and speed limits and appropriate driving behavior patterns for the driving conditions.
5) Do one or more of the following:
   a. Notify local surveillance assets to start actively monitoring vehicles with risky behavior by transmitting location and trajectory information
   b. Notify individual vehicle monitoring systems in the vicinity of vehicles that are driving in a risky manner, of the risk, and make sure that monitoring systems are activated
   c. When vehicles are near the boundary of the aerial surveillance area, notify the adjacent aerial surveillance areas to actively monitor the incoming vehicle.
6) Store the above information for a specified period of time until such time as no accident is detected.
7) If an accident is predicted to happen, for example, due to proximity warnings from aerial surveillance, identify the vehicles involved and transmit the stored information of the driving path of the vehicles involved to the on-vehicle monitoring systems, the insurance company and/or the authorities or emergency responders.

Aerial surveillance at lower altitudes may comprise passive monitoring, for example, at a busy intersection where many accidents are known to happen simply scan the intersection recording a time series of information (for example video) and simultaneously be performing pattern recognition analysis on the information for patterns that would indicate an accident or impending accident. Once an accident is detected or is imminent, the time series data that is pertinent to the accident, is transferred to an analysis station or the authorities or to vehicles involved in the accident.

Surveillance system at an interchange, for example, may not be on an air vehicle, but could be attached to a pole or other structure where sensors are high above the interchange, so effectively there is an aerial view of the interchange.

Active surveillance may be initiated when any passive surveillance system detects a pattern of concern. Active surveillance would occur when a passive surveillance system deviated from it standard sweep path to monitor a specific vehicle or vehicles or a specific location.

5.1.2 on-Vehicle Surveillance

Vehicles equipped with sensors that measure vehicle motion, and vehicle behavior and/or motion and behavior of adjacent vehicles fall into this category and are part of embodiments of this invention.

On-vehicle sensors are monitored for patterns indicative of an accident occurrence or an impending accident. These patterns, for example, could be rapid changes in acceleration, proximity alerts either from video analysis or other electromagnetic monitoring such as sonar, or infrared.

5.1.3 Event Surveillance

Once an accident pattern is detected by any of one of the surveillance systems, then, provided the various system are in communication, the system that detects a pattern transmits the information about the pattern (when and where and what) and requests that other systems be deployed and/or focused on the event of interest.

5.1.4 Ground Based Surveillance

Ground based surveillance can be one of:
Sensors embedded in pavement that detect things such as traffic counts or average speed of vehicles;
Localized weather conditions
Ice or other covering of the road surface
Images of traffic passing past a fixed position.
Any of the above information can be included in an accident pattern to predict when an accident will happen or has happened.

5.1.5 Remote Sensing

Remote sensing such as analysis of imagery from satellites can provide general information about driving conditions, for example, weather. Resolution of imagery would typically be on the other of 1 square meter or more, so in most cases, you could not discern an individual vehicle.

5.2 Aerial Vehicles

A variety of flying vehicles can be used for aerial surveillance. Depending on the design criteria (the altitude of flight, the time in the air, the area of coverage, the weather conditions anticipated), different aerial vehicles are better suited for different applications. Basic types of aerial vehicles include fixed-wing, traditional helicopters, multi-prop copters such as a hexi-copter, blimps or dirigibles; and variations or combinations of the above.

5.3 Deployment

5.3.1 Fixed Location

A fixed location implies that the aerial vehicle is normally housed on the ground when not in use, in a single location that is more or less central to area under surveillance. Size of the vehicle will depend on the application.

5.3.2 Police or Other Moving Vehicle

Police or other emergency vehicles can be equipped with small ROVs or autonomous flying vehicles which can then be deployed when necessary. For real-time applications, such as deployment immediately after sensors indicate that an accident has occurred, it will be necessary to have the flying device attached to the exterior of the vehicle or within a compartment that has a hatch that can open for deployment (Or simply keep in the trunk of the vehicle for manual deployment. If fixed-wing, then some type of catapult may be attached to the flight vehicle; if a rotary type flying vehicle, then some type of secure attachment that can release quickly and/or a spring or chemical propellant that can propel the vehicle vertically.

5.3.3 Always in Flight

Air vehicle can be designed with electric motors powered by batteries which are in turn charged with solar panels. Alternatively, very light weight slow moving fixed wing or blimp type vehicles can be up in the air for extended periods of time with minimal fuel.

5.3.4 Airport

In most cases using an airport for deployment would be reserved for large aerial vehicles that are subject to the same flight restrictions as a piloted aircraft.

5.3.5 On-Vehicle

When wishing to capture information about an accident while it happens or shortly thereafter, in an embodiment, a flight vehicle is in communication with sensors within the vehicle such as accelerometers. When either an impending accident or an accident in progress is detected via analysis of patterns, the flight vehicle is launched very rapidly in an attempt to have a vertical launch should the vehicle begin to roll over. The air vehicle could be a rotary type or a type of rocket with a deployable parachute. A rocket or similar device could be deployed much like a torpedo, from a tube, but vertically oriented.

5.4 Piloting System

5.4.1 Autonomous

Virtually any type of airframe can be made to take off or, land and fly autonomously. This would require location and altitude sensors as well as some frame of reference, for example a digital map or a location beacon either at a fixed location or on a vehicle of interest.

5.4.2 ROV

If the application for surveillance is for accident site observation or normally scheduled surveillance of a predefined area, then the flying vehicle can be piloted remotely

5.4.3 Combination

In the above stated scenario for an ROV, a combination of remote piloting and autonomous flight can be used. For example, take off and landing can be remotely piloted, while in surveillance mode, the flight could be autonomous.

5.4.4 With a Pilot

For high altitude flight or large vehicle flight, then, in an embodiment, an aerial vehicle will contain a human pilot.

5.5 Type of Aerial Vehicles

5.5.1 Quad or Multi-copter

There is a variety of remotely operated or semi-autonomous vehicle which achieve lift using one or more propellers. Configuration with 4 or 6 blades usually mounted in the same plain and all oriented with the direction of thrust perpendicular to the mounting plane. These copter or drones as they are often called come in a variety of sizes from less than a kilogram in weight up to 20 kilograms or more

5.5.2 Fixed Wing

Of course fixed wing aircraft can be flown either piloted, autonomous or semi-autonomously.

5.5.3 Blimp—for High Altitude Long Term Surveillance

Blimps have the advantage that they can stay in flight for extended periods as most of the energy is directed to moving the vehicle rather than keeping it aloft and the helium provides most of the lift.

5.5.4 Projectile with Parachute

For applications where close aerial surveillance is required at an accident scene either while the accident is occurring or immediately thereafter, a parachute mounted sensor suite which comprises a camera and perhaps other sensing devices is contained in a cylindrical or other aerodynamic container which in turn is attached to a chemical propellant or compressed gas engine or a kinetic energy device (for example a spring) capable of propelling the sensor suite and parachute at rapid speed above the vehicle.

The motor or other propulsion device is actuated by a signal from the vehicle monitoring system (or potentially a remote systems) when it detects an accident about to happen or that is in progress. Optionally, the vehicle monitoring system is equipped with a sensor or sensors (such as a gyroscope) that can be used to determine if the vehicle is oriented with the top of the car being up (within a threshold angle). If the top of the vehicle is not up and within the threshold angle of being perpendicular to the vertical direction, the apparatus is not launched—to prohibit injury or damage to objects or people on the ground.

Figure 6:
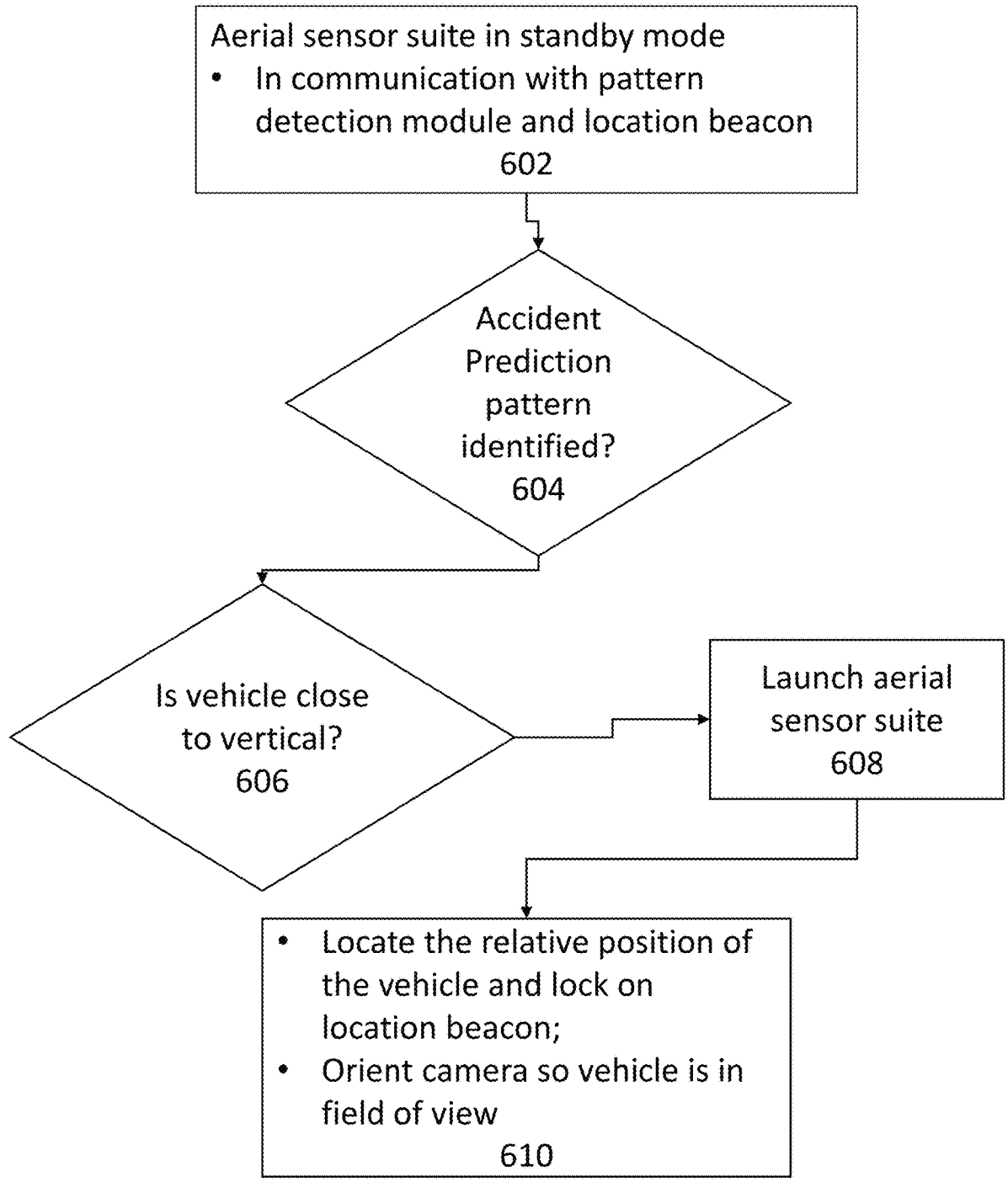
FIG. 6 is a flowchart of events required to launch an aerial reconnaissance device from a vehicle.

FIG. 6 depicts a launch scenario in an embodiment of this invention that utilizes a projectile with a parachute. The apparatus is housed in a weatherproof container with either a retractable hatch or cover that is penetrable by the apparatus. The sensor suite is in standby mode 602 and in communication with a pattern detection module in the vehicle. If an accident pattern is identified 604, the launch mechanism is checked to be in a vertical position 606 and if so, the apparatus is launched 608, the hatch is either opened (prior to engine ignition) or penetrated when the apparatus lifts off. An example of a mechanism for launch would be much like a jack-in-the-box where a cover and latch hold into place the projectile which is mounted on a spring. Once the latch is opened, the projectile is free to exit and the spring force is released propelling the projectile into the air.

Simultaneously with the launch (or previous to the launch) a communication link is established between the launched sensor suite and a directional beacon on the vehicle 610.

At the apex of the flight of the apparatus (or at a specified time or altitude above the vehicle, the parachute is deployed by various means known in the art. By using a direction antenna or other means, the vehicle is located and tracked.

The camera is mounted on a gimbal and servo motors keep the lens oriented towards the car. There may optionally be a servo to stabilize the compass direction of the view of the camera, as the parachute and apparatus may be rotating.

Optionally, the apparatus is equipped with a propeller or propellant to provide a horizontal and/or vertical forces to either prolong the length of time the apparatus can stay airborne or to be able to circle the vehicle for measurements at various altitudes above the vehicle or angles around the vehicle.

The camera may be equipped with a zoom lens to capture more or less detail of the accident scene.

Potential triggers (patterns) that would initiate a launch are the same as described in the section on indications of an accident occurring or about to happen.

Figure 4:
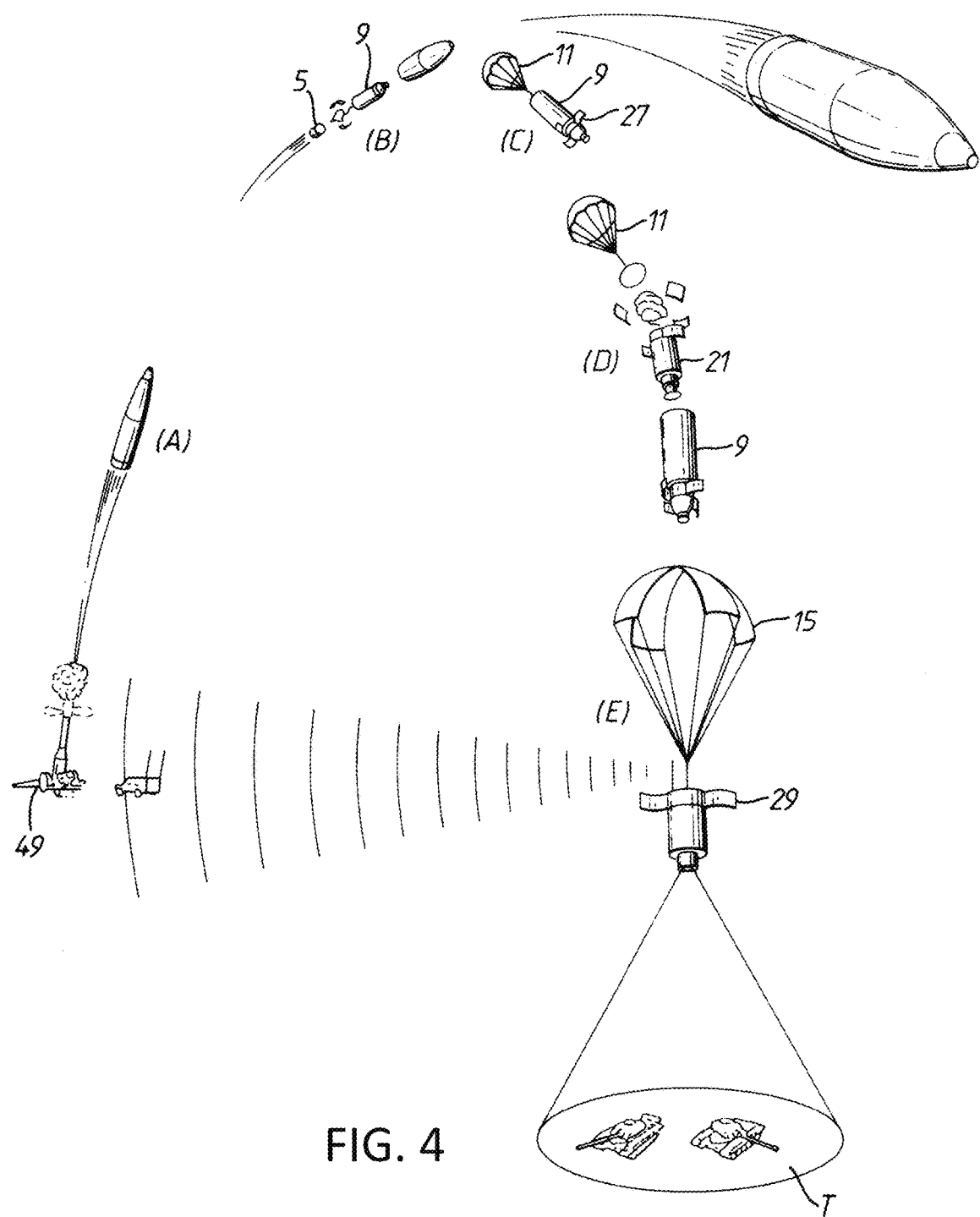
FIG. 4 is a prior art depiction of rocket propelled surveillance system.

FIG. 4 depicts a similar solution in the art (from European Patent Application EP 0466499 A1). In EP 0466499 this is a battlefield aerial surveillance device where a rocket is launched from a ground vehicle 49 at time (A). At time (B) near the apex of the flight the aerodynamic casing of the rocket is separated exposing the surveillance apparatus 9 with a parachute 15 comprising a camera with a field of view 7 and configured with a device to prohibit rotation 29. The video is transmitted to a ground vehicle at time (E).

The present invention differs from EP0466499 in that the rocket deployment is from the vehicle being surveyed and the deployment is initiated based on sensor output and pattern recognition. In addition, the camera may be able to be directed and the parachute may be steerable. In addition, image software may be able to detect the vehicle of interest and zoom in on it.

5.5.5 Autonomous Air Vehicle Deployed from a Ground Vehicle

In an embodiment of this invention an autonomous air vehicle is deployable from a ground vehicle. The air vehicle comprises a communication module that is in wireless communication with on-board sensors in the ground vehicle. If a pattern is detected by the surveillance module in the ground vehicle that indicates that an accident in progress or that an accident has happened, this in-turn triggers the launch of the autonomous air vehicle.

Figure 5:
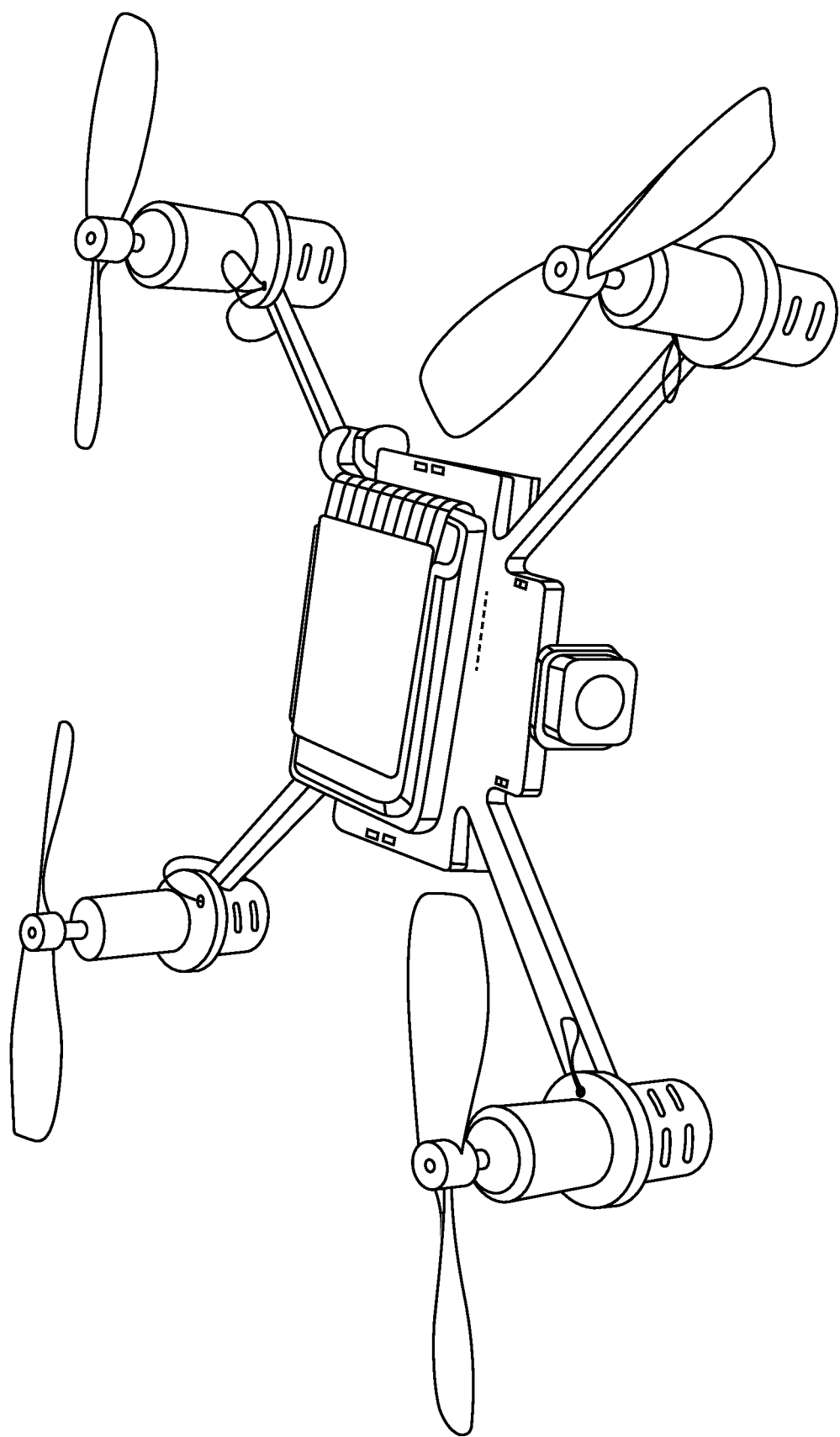
FIG. 5 is a prior art depiction of a small quad copter with mounted camera.

Commercial quadcopters are available in a small form factor, for example as shown in FIG. 5 (see https://www.alwaysinnovating.com/products/mecam.htm). A quadcopter of this size could be launched from a vehicle in a variety of ways:

A rigid quadcopter could be contained in a spherical container housed in a vertical tube imbedded in the vehicle. A spring loaded propulsion mechanism much like the mechanism used to proper a ball bearing in a pin-ball machine could be held in place by a latch. The latch could be triggered by the recognition of an accident pattern.

Alternatively, the cross arms of the quadcopter could be folded at a point where the two arms cross in the center such that two adjacent motors are nearly touching one another on opposite sides. The apparatus in the folded stated could be housed in a bullet or rocket shaped container and launch much like the parachute system of the previous section.

5.5.6 Combination of the Above

In an embodiment, a rocket is used to deploy payload of a sensor suite attached to a fixed wing or rotary aircraft. An example of a vehicle that may be suitable for this type of deployment is show, for example in U.S. Pat. No. 8,444,082 B1.

5.6 Fuel for Aerial Vehicle

Conventional methods for fueling an aerial vehicle include many petroleum products including gasoline, aviation fuel, jet fuel, alcohol and others. In addition, smaller aircraft designed for short flight can use light weight batteries and electric engines. For longer duration flights, for very light aircraft such as a blimp, solar panels or some form of photovoltaic can be affixed to surfaces of the craft to charge batteries while in flight.

5.7 Sensors

There is a variety of sensors that can be used to determine both vehicle movement and behavior and the conditions associated with the vehicle movement and behavior. Various type of sensors may be used with aerial vehicles, at fixe ground locations or within vehicles.

Numerous sensors can be used in vehicle surveillance. A comprehensive summary can be found in: *A Summary of Vehicle Detection and Surveillance Technologies used in Intelligent Transportation Systems* (see https://www.fhwa.dot.gov/ohim/tvtw/vdstits.pdf) although this text is somewhat dated now.

Examples of sensor that can be deployed from Aerial vehicles:
  Camera—both natural color and infrared
  LIDAR
  GPS
  Gyroscope
  Digital Map Examples of sensor that can be part of a vehicle or in a vehicle
  Accelerometers
  Temperature sensors
  Forward facing camera
  Backup camera
  Air bag deployment
  Gyroscope
  GPS
  Engine sensors
  Tire pressure
  Speedometer
  Digital map
  Seat belt or seat pressure sensor
  ABS braking actuated
  Examples of Road Side Sensors
  Traffic Counts
  Average Speed Limit
  Weather and Road Condition Sensors
  Vehicle Tracking Part of a worldwide research effort in intelligent transportation systems (ITS), there is a variety of methods using sensor networks of various types to detect the movement of vehicles and track them. See for example: *A Study on Vehicle Detection and Tracking Using Wireless Sensor Networks* 2010, by G. Padmavathi, D. Shanmugapriya, M. Kalaivani (http://www.scirp.org/journal/PaperInformation.aspx?PaperID=1385#.VK555XthQUU)
  Examples of types of satellite imagery
  Color image
  Infrared image
  Radar/Lidar 5.7.1 Location Determination Devices
  5.7.1.1 Satellite Based In virtually all of the surveillance methods, there is a need to know where the surveillance vehicle is with respect to a vehicle or accident location and/or with respect to the earth, for example, latitude and longitude.

For a location relative to the earth, typically a GPS (Global Position Satellite Receiver) is used. This type of device can also be used to determine a low resolution altitude. As a GPS requires a line-of-site view of 3 (or more) satellites to determine a position, sometimes is may be necessary to augment a location determination with techniques known in the art such as dead reckoning using a gyroscope, and/or a digital compass or other sensors. There are also other satellite location systems available from both Russia and the European Union.

In the case of a sensor suite deployed from a vehicle that will imminently be in an accident or was in an accident, it may only be necessary for the sensor suite to orient itself, relative to the plane of the earth and the location of the vehicle. This orientation can occur by using a beacon mounted in the vehicle.

5.7.1.2 Local Area Network Triangulation

Most portable electronic devices are equipped with some form of local area networking, for example, Bluetooth Low Energy. As part of the protocol for a communication standard such as this, there is a parameter that is a measure of signal strength of the radio frequency signal that is received by a receiver from a transmitter. It is well known in the art that by knowing the signal strength from three different transmitters that are geographic spaced, the relative location of the receiver with respect to the three transmitters can be determined. Of course there is a substantial amount of error in the signal strength measurement so this method only provides an approximate relative location.

5.7.1.3 Radio Direction Finding

If a vehicle is equipped with a radio frequency transmitter and as part of a sensor suite that is deployed using a rocket or a aerial vehicle deployed from the vehicle, there is a directional antenna that receives an indication of signal strength of the transmitted frequency from the radio transmitter, it is possible to determine the relative location of the sensor suite to the vehicle—so that video or other sensors can be directed towards the vehicle.

5.7.1.4 Dead Reckoning

When a sensor suite is deployed from a moving vehicle, the vehicle and/or the sensor suite are equipped with sensors that can measure the velocity and direction of motion. In an embodiment, at the time of deployment of the sensor suite, the direction of motion and the speed of the vehicle is known. The acceleration profile of the sensor suite based on the propellant system used and the relative direction of deployment with respect to the vehicle motion is known. Assuming the that vehicle will continue to travel in the same direction at the same speed, the relative position of the sensor suite with respect to the vehicle can be calculated through time. This will enable a gimbal mounted camera to be continually pointed in the direction of the vehicle. Of course this assumes that the vehicle continues to move in the same direction and speed which would not necessary be the case if a collision occurs. Therefore, in an embodiment, the camera would initially point towards the vehicle, and would further register an image of the vehicle and track the vehicle using conventional image analysis software described elsewhere in this document such that the video can be trained on the vehicle and not stay on the anticipated trajectory of the vehicle.

5.7.2 Altimeter

There are a variety of altimeters known in the art, which include ones based on barometric pressure and/or a combination of barometric pressure and gps measurements and potential gyroscopic measurements. Altitude is important when dealing with position relative to the earth rather than relative to a moving vehicle.

5.7.3 Digital Map and Terrain Model

In scenarios where a pattern is used to identify when a vehicle is driving erratically or when a vehicle is off the road, then once the location of a vehicle is identified, it must be compared with a digital road map in order to determine the above. Of course the accuracy of the measurement of location of the vehicle and the accuracy of the digital map must be sufficient such that there is a high confidence of where the vehicle is relative to the road.

5.8 Patterns

A pattern is the term used to describe one or more time-series of sensor readings that can be analyzed to:

Predict that an accident will happen

Determine that an accident has happened

Predict the extent of the damage and injury incurred during an accident

Simply track a vehicle over time and its relationship to a road network

The sensors involved can be associated with any or all of the surveillance systems described above. Associated with each pattern is a statistical uncertainty in the prediction. Patterns may comprise a time series of a specific sensor measurements or may comprise a collection of calculated parameters inferred from a variety of sensor measurements. For example, acceleration could be measured directly by an accelerometer or inferred from location measurements over time from a GPS receiver and/or a combination of these two types of measurements could be used to determine a mean acceleration for a given time interval by a weighted average of the two measurements, with more weight being attributed to the measurement deemed the most accurate.

Patterns could also be analyzed in the frequency domain using Fourier analysis

Patterns are determined by some form of multivariable analysis such as machine learning where data is collected from sensors for many accidents where the extent of damage and severity of impact are known.

Raster image analysis can be considered another form of pattern analysis. In this case vehicles are identified and tracked.

Conventional analysis of measurements from several types of sensors that measure different physical parameters over time may not be able to identify complex patterns associated with an impending accident. Or it might not be obvious how these measurements are related to a known accident hazard (for example ice on the road). Machine learning techniques applied to historical data may identify complex patterns that relate sensor output overtime to accident potential without identifying the underlying cause or causes of the accident potential.

Determination of patterns that can be used to predict or detect accidents and the results of accidents are described in: U.S. patent application titled "SYSTEM AND METHOD FOR USE OF PATTERN RECOGNITION IN ASSESSING OR MONITORING VEHICLE STATUS OR OPERATOR DRIVING BEHAVIOR", application Ser. No. 13/679,722, filed Nov. 16, 2012; which claims the benefit of priority to U.S. Provisional Patent Application No. 61/578,511, filed Dec. 21, 2011; PCT/US12/71487 titled "SYSTEMS AND METHODS FOR ASSESSING OR MONITORING VEHICLE STATUS OR OPERATOR STATUS" filed 21 Dec. 2012; and Ser. No. 14/317,624 titled "System and method for Determining Of Vehicle Accident information" file on 27 Jun. 2014; each of which the above applications are herein incorporated by reference.

Below are examples of physical events that can be used to anticipate an impending accident. These indicators can be measured in a variety of ways with a variety of sensors and one or more of these measurements can be incorporated into patterns. These are just examples and as stated above, patterns may be determined using machine learning that cannot be correlated with a single physical event, but never-the-less have a strong correlation with an impending accident and an accident in progress. The indicators below and other can be used to, for example, to initiate an airborne launch of a sensor suite. Examples of patterns and/or physical events are:

Rapid deceleration above a specific threshold that would indicate emergency braking. One method of detection of rapid deceleration would be to monitoring vehicle onboard accelerometers and gyros. Airbag deployment Rapid change in direction that would indicated spinning on ice or locked brakes [again, augmented by accelerometer and gyro sensing]

Extremely close proximity to other vehicles as detected by video camera or other proximity sensor such as sonar, radar or infrared Patterns may be expressed as polynomial equation; they may be a threshold constant or upper and lower range for a specific sensor; they may be based on frequency and/or amplitude analysis of a single type or multiple types of sensors or they could be a statistical mean value for one or more sensor outputs or environmental factors. Patterns will change over time as more data is added, more sophisticated analysis is performed or more sensor types are available for on-board measurement. Patterns for one type of vehicle may be entirely different than for another type of vehicle. This may be due to different sensor suites being available or different physical attributes of the vehicle.

5.8.1 Image Analysis Software to Detect Ground Vehicles

In order to detect vehicles from raster images, one method is to use vehicle recognition software. Patterns in an image that are indicative of a vehicle. There are several methods for analyzing both video, still and infrared imagery to detect vehicles. One example of a method for recognizing vehicles in a image is *Real-time People and Vehicle Detection from UAV Imagery* by Gqszczak, A, et al (see http://breckon.eu/toby/publications/papers/gaszczak11uavpeople.pdf). By tracking the location of an identified vehicle through an image over time, the acceleration and velocity of the vehicle can also be determined. If the image is orthorectified to align with a digital road network, then the location of a vehicle with respect to the road network can be determined.

5.8.2 Patterns from Vehicle Sensors

New data is collected from vehicle on-board sensors and from external feeds such as sensor suites that are part of the road network system or for example from weather satellites. At given time intervals the data for the last time period is stored and analyzed and the older data is thrown out (provided no patterns of interest were detected). Alternatively, the data is stored in a memory stack of a set size where new data is added to top of the stack and the oldest data (at the bottom of the stack) is thrown out. At intervals which could correspond to the sample interval or multiples of the sampling rate, an accident pattern or impending accident pattern is looked for. If a patterns is detected, indicating an accident or impending accident has occurred or will occur, then the sampling rate may be increased to acquire more data per time period, and/or other sensor data, previously not being recorded, may be recorded.

The end of the accident event, in an embodiment, is defined when the vehicle is stationary. Once the accident is over, the stored data is analyzed to detect damage and injury patterns. If accident and/or injury patterns are detected, then the location and estimated damage and injury associated with these patterns is recorded and transmitted to pertinent individuals or computer servers.

If the severity of injury anticipated by the analysis is sufficient, then an ambulance and/or paramedic is contacted (provided communication is available). If a tow is needed, then a tow vehicle is called, provided the local information for such services is available. An insurance adjuster is contacted. Parts and repair services are queried to check availability. Depending on the configuration, information about the accident is displayed on an infotainment screen in the vehicle or on an authorized portable device.

The raw data and/or the sensor analysis is transferred to a server via the communication network (wireless, or otherwise) for inclusion into the central database and for future determination of accident, damage and injury patterns.

Figure 3:
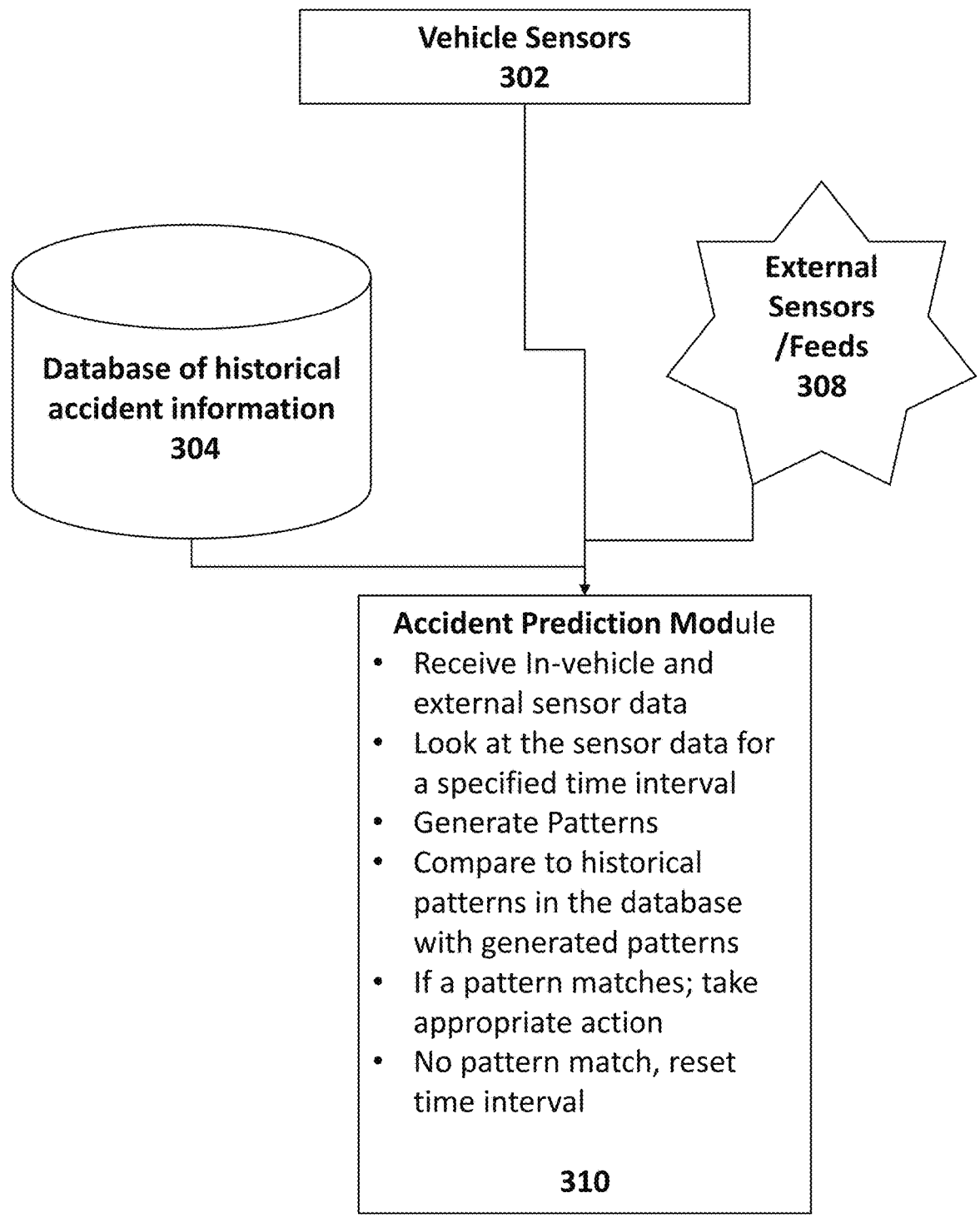
FIG. 3 is a flowchart showing input into an Accident Prediction Module

FIG. 3 illustrates and embodiment using a monitoring system within the vehicle. Real-time time series data is acquired from many sensors on-board the vehicle 302 and transmitted to an Accident Prediction Module 310. In addition, the Accident Prediction Module 310 receives external information from other surveillance systems 308 by wireless communication. At intervals, the Accident Prediction Module 310 performs analysis comparing the sensor data feeds 302, 308 to accident patterns acquired from a historical database 304. If an accident pattern is matched to the sensor feeds, this triggers recording of detailed information and a search for damage and injury patterns within the data. If a damage or injury pattern is detected, then analysis is performed concerning the extent of damage or injury and the location of damage or injury and this information along with the underlying data is transmitted to interested parties.

It may be desirable to limit the data/parameters that are utilized and make some simplifying assumptions.

Accident detection patterns could be inferred simply by knowing the weight of the car and inferring a maximum acceleration or change in momentum that would indicate an accident occurred. Damage and Injury patterns are approximated by relating specific accident descriptions to ranges of acceleration or momentum and the direction of impact. Once accidents are categorized as to the location and severity of damage in terms of anticipated range of acceleration that occurred during an event, then a cross correlation between repairs and injury treatments required for a given vehicle type can be made with the each range of acceleration.

Examples of patterns to record are:
Number of Occupants of the vehicle
Impact zone
Roll or skid characteristics
Deceleration
Movement of occupants
Distortion of passenger compartment
Breaking of glass
Thermal (indication of fire)
Rear facing camera—following car too close
Front facing camera—too close to forward car; cars serving in from other lanes
Rapid steering changes
Brakes Locking 5.8.3 Pre-Accident Aerial Surveillance It is desirable to predict when an accident will occur prior to it happening so the accident can be observed while in progress or alternatively to initiate some action that would avoid the accident. Some examples of patterns that might indicate an accident about to happen would be:

A vehicle exceeding the speed limit over a certain threshold
Erratic driving behavior
Vehicles without a safe distance between
If questionable behavior found:
Record video; record speed/acceleration profile; record lane changes
Monitor for a prescribed time or until an accident occurs
OCR the license plate; send warning message for continued bad driving; citation if bad behavior does not cease.
If no questionable behavior lock onto another vehicle 5.8.4 Aerial Monitoring of Distance Between Vehicles Using image analysis techniques described previously, it is possible to identify specific vehicles in images and in successive images, identify those same vehicles as they move through an area. By knowing the relative time when the images were acquired and the location of the vehicles in the image, parameters or patterns can be determined.

If the relative distance between two vehicles as determined in either macro or local aerial monitoring becomes less than a threshold value—indicating that collision is about to occur—several actions could happen:

Information acquired about the vehicles of interest for the time leading up to the time period in question is set aside and stored.
Velocity and Accelerations are calculated
Event surveillance assets are communicated with and deployed
Sensor systems within the cars themselves are contacted via wireless communication and instructed to record information at a rapid rate.
Pre-accident patterns from the vehicle/s are compared with patterns either from macro aerial or local aerial surveillance systems to verify the analysis
If the aerial surveillance is capable, acquire the license number of the vehicles involved
If one or more of the vehicles is moving out of the surveillance area, alert adjacent surveillance areas to be on the look-out.
When in communication with vehicle equipped with deployable surveillance systems, signal that one should be deployed 5.8.5 on-Vehicle Monitoring of Adjacent Vehicles A variety of methods exist in the art to determine the distance between one vehicle and adjacent ones. There are a variety of sensors that can be used to detect an adjacent vehicle. Video cameras for example could be used in conjunction with vehicle detection software to know when an adjacent vehicle is too close. Adjacent vehicles will reflect light and other forms of electromagnetic radiation such as infrared, and/or may be equipped with an active transponder which transmits a signal which can be located and identified.

5.8.6 on-Vehicle Accident Detection

The ultimate goal of using in-vehicle accident detection would be to anticipate an accident before it happens to enable deployment of emergency services and also to assess the severity of the impending accident in real-time. Rapid assessment immediately after an accident is also the goal—should there be no way to detect the accident beforehand.

Modern vehicles are generally equipped with a variety of sensors that measure physical parameters associated with the moving vehicle. These sensors can be a part of the vehicle or within the vehicle, for example as part of a mobile device.

Vehicle behavior can be inferred based on patterns exhibited in the sensor data overtime—either from observations of a single type of sensor or a sensor suite, for example a gyroscope and also a 3 component accelerometer. Rapid changes in the orientation of the vehicle may be exhibited by changes in the values measured by a gyroscope and/or accelerometers. It is intuitively known, for example, if a car is spinning on wet pavement or on ice, that there is a strong likelihood that the vehicle will sustain damage and/or passengers will be injured. However, this likelihood can be quantified by tracking patterns in the sensor output leading up to previous accidents with known damage and injury—performing statistical analysis on those patterns. It may be determined that if a vehicle spins 360 degrees within 3 seconds, when the initial speed was 90 kph, that there is a 90 percent probability that the vehicle will flip over. If we take into account the type of vehicle, it may be apparent that a vehicle with a high center of gravity will have a higher probability of rolling over than a vehicle with a low center of gravity. It may further be found that if a vehicle flips with the initial speed that there is a 50% probably of severe injury to a passenger in the front seat.

5.8.7 Remote Accident Detection—Aerial

Patterns observable from aerial surveillance may indicate:
A burning vehicle (infrared signature)
Vehicle off-road or eschew on the lane (based on image recognition of vehicle location when compared to a digital road map)
Overturned vehicle (as indicated by changes in the image recognition profile of the vehicle)

5.9 on-Vehicle Accident Detection Hardware

Hardware for an on-board accident detection and analysis system comprises the following components:
a processor which monitors and analyses onboard sensors used to detect vehicle activity and driver behavior;
an on-board database comprising:
  vehicle specific information;
  patterns, for the individual vehicle type, used to analyze sensor data to detect accidents and to assess resulting injury and damage and useful to predict driver behavior and driver/insurance risk;
  driver information;
  emergency contact information;
one or more of several data transmission components which can include both short range wireless (for example Bluetooth), long range wireless transmission (for example mobile service) and wired data communication component—which can communicate with external servers to transmit both raw sensor data and damage/injury estimation and to provide software and database updates to the vehicle on-board system.
a remote central server in communication with multiple vehicle systems comprising:
  one or more computers;
  a comprehensive central database located on one or more servers comprising:
    historical information from several sources
    raw sensor data or indices derived from the raw sensor data from individual vehicles.
  patterns for all vehicle types and areas
  geographic Information
  spatial, temporal, and severity Information pertaining to historical accident incidents
  metadata

5.10 Procedures Concerning Response to Patterns 5.10.1 Response after Accident Detected If an accident pattern is detected by any surveillance method, then in an embodiment, the following scenario would occur:
send wireless transmission to a surveillance dispatch
look for drones, fixed cameras or moving camera that are in the vicinity of the detected accident
dispatch and/or point surveillance device at the accident
once an accident is identified, circle from several angles for a 3-D view
transmit Data to an Accident Investigator and/or emergency services 5.10.2 Response for Cars Equipped with Own Drone, Once Accident is Detected Once a pattern from an incident detection system is identified that would indicate with a high degree of certainty that an accident is about to happen, the system will initiate the following sequence:
1) launch drone or rocket
  a) if the vehicle is equipped with a spring loaded hatch, open it
  b) check the orientation of the car to make sure that the launch will be relatively vertical—based on vehicle sensor input such as magnetometers or accelerometers.
2) simultaneous to launch or prior to the launch, establish wireless communication with the vehicle including one or more location beacons
3) once the drone or rocket reaches its apex, use a gyro in the device to stabilize orientation (down facing down)
4) use a gimbal mount and servo motors to orient a video camera or other sensor in the direction of the vehicle
5) if equipped, use vehicle recognition to zoom the camera or other sensors in such that the vehicle or vehicle that are in the accident fill the field of view (in other embodiment both a near and fare range image are taken.
6) do several passes of vehicle at various altitudes with respect to the vehicle altitude and several view angles

5.11 Historical Analysis of Collected Data 5.11.1 Patterns for Sensor Records and Accident Reports The following tasks comprise one method to determine accident patterns initially based on accident reports:
Develop transfer functions between observations in historical databases built from accident reports to on-board sensor measurements that are indicative of the observed damage. For example, an accident impact could be inferred when a rapid deceleration is detected either by accelerometer measurements or change in speed measurements. Location, and relative speed of an impact can be inferred based on 3 component acceleration. Alternatively, a side impact can be inferred when a side airbag is deployed.
Test the transfer function by predicting vehicle damage and resulting cost based on sensor data after an accident. Confirm the prediction based on conventional accident and insurance adjustor reports.
Refine the transfer functions as necessary to increase statistical reliability.
Gradually incorporate sensor measurements and create a more granular predictive models based solely on sensor measurements (without inference from historical data not from sensors). In the initial database collisions may be classified based on relative speed of impact, for example. With more accurate speed data from sensors and vehicle weights, the classification could be changed to an impact momentum in $N/m^2$ using finer ranges for classification rather than simply an approximate relative speed of collision.

5.11.2 Comparison of Traffic, Weather and Sensor Data and the Likelihood of an Accident After performing analysis of many sensors reading from many vehicle and correlating this information with weather information and road condition information, patterns may emerge that can be used to identify area and timeframes where accident are very likely to occur. These predictions can then be used to deploy aerial surveillance system for increased surveillance in accident prone zone or at accident prone timeframes.

5.12 Combining Datasets Measuring the Same Parameter from Different Types of Sensors or Sensors with Differing Resolution Ideally, it would be easier to identify specific patterns indicative of an imminent accident, an accident event or damage and injury related to an accident if the database comprised identical measurements, for example if the sampling rate and resolution and accuracy of an accelerometer was always the same. In practice, this would never happen as sensor technology continues to advance. Therefor predictions based on low resolution, accuracy or a slow sampling rate must have an indication that the prediction is less certain than a prediction based on better quality information. As new, better quality information is stored in the database, older, poorer quality data should be removed from the database and patterns adjusted accordingly.

Raw data may need to be parameterized in such a way as they can be used into a numeric model. An example of parameterization would be to characterize incidents into a grouping. For example, it may be desirable to collectively refer to impact force based on accelerometer readings in ranges in units of meters/second$^2$ rather than actual recorded values or as a mean over a time frame.

5.13 Database Maintenance

Database maintenance comprises removing older or poorer quality data, continually updating the patterns as newer and better information comes on line. In addition, as the database increases in size, patterns can be broken into smaller subdivisions, for example, an accident pattern could be vehicle type specific as to vehicle class specific.

5.14 Database Content

In addition to raw sensor output, patterns, currency of data and the resolution and accuracy of the data must be stored. Other pertinent information is:
Location of fixed sensors systems including range of operation
Range of fixed based aerial vehicles and sweep are; length of deployment; weather extremes that operation can occur.
Standard sensor suites in a stock vehicles—including access protocol and frequency, procession and accuracy of measurements
Video resolution and color perception and/or frequency range

5.15 Example Embodiments

In an embodiment, a vehicle accident surveillance network comprises at least one of:
a) one or more surveillance systems which in turn comprises:
  i) a sensor suite configured to observe ground based vehicles;
  ii) a pattern recognition module configured to interpret the sensor suite readings as vehicle movements, locations, pending accidents, and accident incidents and to identify specific vehicles; and
  iii) a wireless transceiver configured to transmit and receive the identity and location of specific vehicles that had pattern identified, to surveillance systems;
b) one or more deployable aerial surveillance systems comprising:
  i) an airframe configured to launch from one of a ground based vehicle, and fixed base station, and a larger airframe, wherein a launch is triggered by detection of a pattern indicative of an accident occurring or about to occur as detected by one or more of the surveillance systems;
  ii) a second wireless transceiver configured to receive the identity and location of the vehicle or vehicles which correspond to identified patterns from one or more surveillance systems;
  iii) a directional sensor suite configured to be directed towards the identified vehicle or vehicles after deployment of the aerial surveillance system; iv) an aerial surveillance module configured to:
    1. receive the location of the vehicle or vehicles identified by one or more surveillance systems;
    2. launch the one or more deployable aerial surveillance systems;
    3. after being launched, determine the relative location of the identified vehicle or vehicles, and one or more of: approach the identified vehicle, circle the accident scene at a predetermined circumference and altitude, and point the directional sensors towards the vehicle or vehicles and record the sensor data.

In an embodiment, a deployable aerial surveillance system is configured with a receiver that can identify a location beacon (for example attached to a vehicle) and track the location beacon.

In an embodiment, deployable aerial surveillance systems are deployed by an operator when the system is provided with one or more of:
c) coordinates of a vehicle to be surveyed;
d) a trajectory of a vehicle to be surveyed; and
e) specification of a location beacon that resides in the vehicle to be surveyed that can be tracked by the system.

Vehicle accident surveillance network can be one or more of:
f) an airborne surveillance system;
g) a ground based vehicle equipped with a surveillance system; and
h) a ground based stationary surveillance system.

In an embodiment, airborne surveillance systems are configured:
i) with image detection sensors that observe the earth below in a plurality of spectral bands; and
j) the pattern detection module is configured to detect vehicles using image analysis techniques.

Surveillance systems, in an embodiment comprises a memory cache configured to store sensor data from sensors for a predetermined time prior to the present time and further configured to save this data upon detection of a pattern and continue to save incoming sensor data for a predetermined time after the pattern is detected.

An embodiment of a vehicle accident surveillance system installed in a ground vehicle comprises:
k) an on-vehicle sensor suite configured to observe location and motions of the ground vehicle;
l) a pattern recognition module configured to interpret the sensor suite readings as pending accidents, and accident incidents; and m) a deployable aerial surveillance system comprising:
  i) an airframe configured to launch from the vehicle when triggered by detection of a pattern indicative of an accident occurring or about to occur;
  ii) a directional sensor suite configured to be directed towards the vehicle after deployment of the aerial surveillance system;
  iii) an aerial surveillance module configured to:
    (1) launch the deployable aerial surveillance system;
    (2) after being launched, determine the relative location of the vehicle, and one or more of: approach the vehicle, circle the vehicle at a predetermined altitude and circumference from the vehicle and point the directional sensors towards the vehicle and record the sensor data.

A vehicle accident surveillance system installed in a ground vehicle can optionally be configure with a directional sensor suite that contains one or more cameras.

A transceiver in an accident surveillance system is optionally configured to:
  n) communicate with other accident surveillance systems; and
  o) launch a deployable aerial surveillance system to observe the ground vehicle, the vehicle containing the requesting surveillance system or other ground vehicles.

In an embodiment, a vehicle accident surveillance system installed in a ground vehicle comprises:
  p) an on-vehicle sensor suite configured to observe location and motions of the ground vehicle;
  q) a pattern recognition module configured to interpret the sensor suite readings as pending accidents, and accident incidents; and
  r) a wireless transmitter configured to transmit a request to nearby surveillance systems to deploy and monitor the ground vehicle should the pattern recognition module detect a pattern indicative of a potential accident or accident.

6 REMARKS

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed:

1. A vehicle accident surveillance network, comprising:
a) plural first surveillance systems, each comprising
a sensor suite configured to observe ground-based vehicle or vehicles;
a pattern recognition module configured to identify from sensor suite readings patterns corresponding to one or more of ground-based vehicle movements, locations, pending accidents, and accident incidents and to identify specific ground-based vehicles; and
a first wireless transceiver configured to transmit and receive the identity and location of specific ground-based vehicles that had pattern identified, to other surveillance systems within said network;
wherein the one or more first surveillance systems comprise at least one airborne first surveillance system, at least one ground-based vehicle first surveillance system, and at least one ground stationary first surveillance system; and
wherein said at least one airborne first surveillance system comprises an airframe configured for autonomous powered flight, the sensor suite of said at least one airborne first surveillance system includes image detection sensors that observe the earth below in a plurality of spectral bands, the pattern recognition module of said at least one airborne first surveillance system is further configured to use image analysis to identify said patterns including said pending accident and accident incident patterns; and
b) plural deployable aerial surveillance systems, each said deployable aerial surveillance system comprising:
an airframe configured for autonomous powered flight;
a second wireless transceiver disposed on the airframe configured to receive the identity and location of the ground-based vehicle or vehicles which correspond to identified patterns from one or more first surveillance systems and to transmit sensor data;
a directional sensor suite disposed on the airframe configured to be directed towards the identified ground-based vehicle or vehicles after deployment of the deployable aerial surveillance system; and
an aerial surveillance module disposed on the airframe and communicating with the second wireless transceiver and directional sensor suite, said aerial surveillance module configured to navigate to the received location of the identified ground-based vehicle or vehicles, and point the directional sensor suite towards the ground-based vehicle or vehicles and record sensor data through said directional sensor suite.

2. The vehicle accident surveillance network of claim 1, wherein said deployable aerial surveillance systems are further configured with a receiver that can identify a location beacon and track the location beacon.

3. The vehicle accident surveillance network of claim 1, wherein said deployable aerial surveillance systems are further configured to be deployed by an operator when the system is provided with one or more of:
coordinates of the ground-based vehicle to be surveyed;
a trajectory of the ground-based vehicle to be surveyed; and
specification of a location beacon that resides in the ground-based vehicle to be surveyed that can be tracked by the system.

4. The vehicle accident surveillance network of claim 1, wherein said deployable aerial surveillance systems comprise one or more of:
a fixed wing aircraft;
a rotary aircraft with one or more rotors; and
a lighter than air craft.

5. The vehicle accident surveillance network of claim 1, wherein said plural deployable aerial surveillance systems are further configured with image detection sensors that observe the earth below in a plurality of spectral bands, and a pattern detection module configured to detect ground-based vehicles using image analysis techniques based on images from the image detection sensors.

6. The vehicle accident surveillance network of claim 1, wherein one or both of the first and second wireless transceivers are configured to transmit sensor data and analysis to interested parties comprising one or more of:
first responders;
insurance adjusters; and
ground-based vehicle owners.

7. The vehicle accident surveillance network of claim 1, wherein said first surveillance systems further comprise a memory cache configured to store sensor data from sensors for a predetermined time prior to a present time and further configured to save the stored data upon detection of a pattern and continue to save incoming sensor data for a predetermined time after the pattern is detected.

8. The vehicle accident surveillance network of claim 1, wherein said first surveillance systems are additionally configured to monitor driving conditions for ground-based vehicles.

9. The vehicle accident surveillance network of claim 1, wherein at least one said ground-based vehicle first surveillance system comprises a vehicle accident detection system installed in a ground-based vehicle, comprising:
- an on-vehicle sensor suite configured to observe location and motions of the ground-based vehicle; and
- a pattern recognition module configured to interpret the sensor suite readings as pending accidents, and accident incidents.

10. The vehicle accident surveillance network of claim 9, wherein at least one said deployable aerial surveillance system comprises:
- an airframe configured to launch from a ground-based vehicle first surveillance system when triggered by detection of a pattern indicative of an accident occurring or about to occur;
- a directional sensor suite configured to be directed towards the ground-based vehicle after deployment of the aerial surveillance system therefrom, wherein the directional sensor suite comprises one or more cameras; and the aerial surveillance module is further configured to launch the said deployable aerial surveillance system from the said ground-based vehicle first surveillance system.

11. The vehicle accident surveillance network of claim 1, wherein at least one said ground-based vehicle first surveillance system comprises a vehicle accident detection system installed in a ground-based vehicle, said installed system comprising:
- an on-vehicle sensor suite configured to observe location and motions of the ground-based vehicle;
- a pattern recognition module configured to interpret the sensor suite readings as pending accidents, and accident incidents; and
- a wireless transmitter configured to transmit a request to nearby deployable aerial surveillance systems to deploy and monitor the ground-based vehicle should the pattern recognition module detect a pattern indicative of a potential accident or accident.

12. The vehicle accident surveillance network of claim 1, wherein said directional sensor suite comprises one or more image detection sensors disposed on the deployable air frame and configured to observe the earth below in a plurality of spectral bands; and the a pattern detection module configured to detect ground-based vehicles using image analysis techniques based on image sensor detection sensor data received from the deployable aerial surveillance systems.

* * * * *